June 20, 1933. W. HUNT 1,914,776
FLUID PRESSURE REGULATOR
Filed April 12, 1930 2 Sheets-Sheet 1

Inventor
William Hunt.

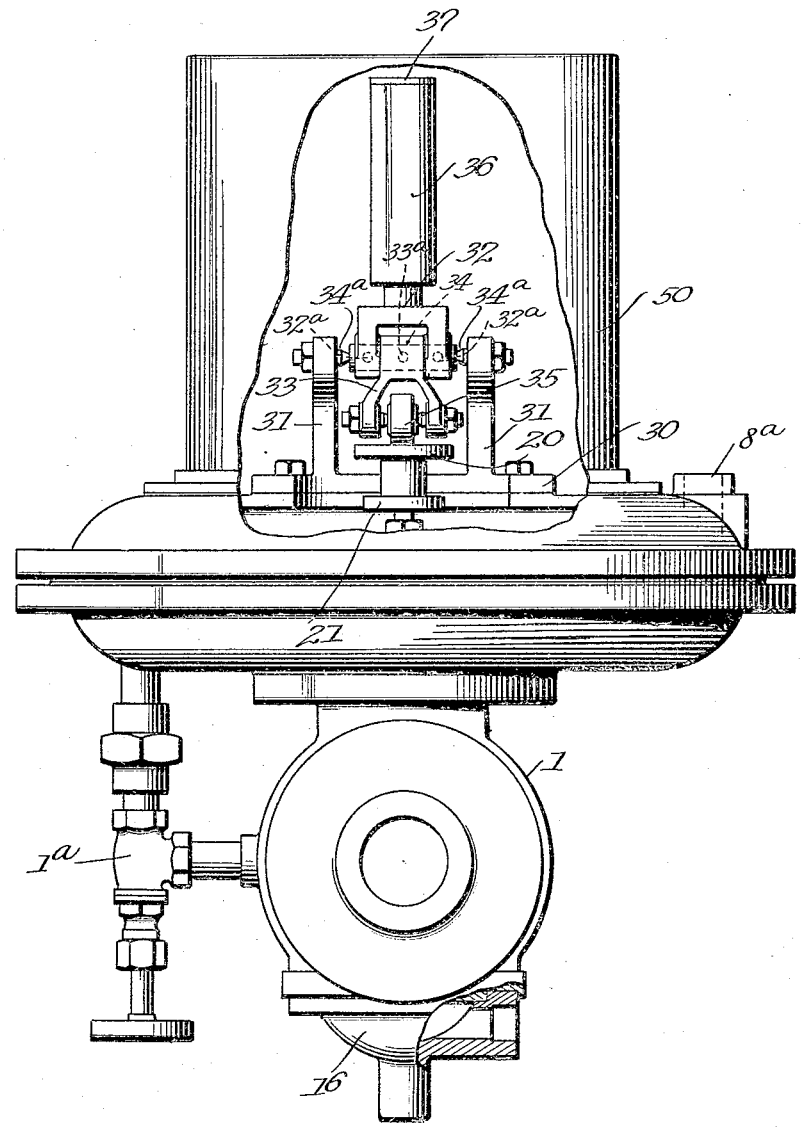

Patented June 20, 1933

1,914,776

UNITED STATES PATENT OFFICE

WILLIAM HUNT, OF BALTIMORE, MARYLAND, ASSIGNOR TO THE C. M. KEMP MANUFACTURING COMPANY, OF BALTIMORE, MARYLAND, A CORPORATION OF MARYLAND

FLUID PRESSURE REGULATOR

Application filed April 12, 1930. Serial No. 443,313.

The present invention relates to improvements in fluid pressure regulators and has for its principal purpose to provide a governor means for such regulators which will insure constant pressure in the outlet conduit of a fluid pressure regulator casing, or an increase in delivery pressure in accordance with an increase in the demand for fluid, or effect a reduction of such pressure if the demand for fluid exceeds a predetermined amount.

The invention is particularly applicable for use with regulators for gaseous fluids and by it an objection common to regulators for this particular purpose as commonly constructed is avoided.

In the accompanying drawings:—

Figure 2 is an end elevation with part of the casing broken away.

Figure 1:
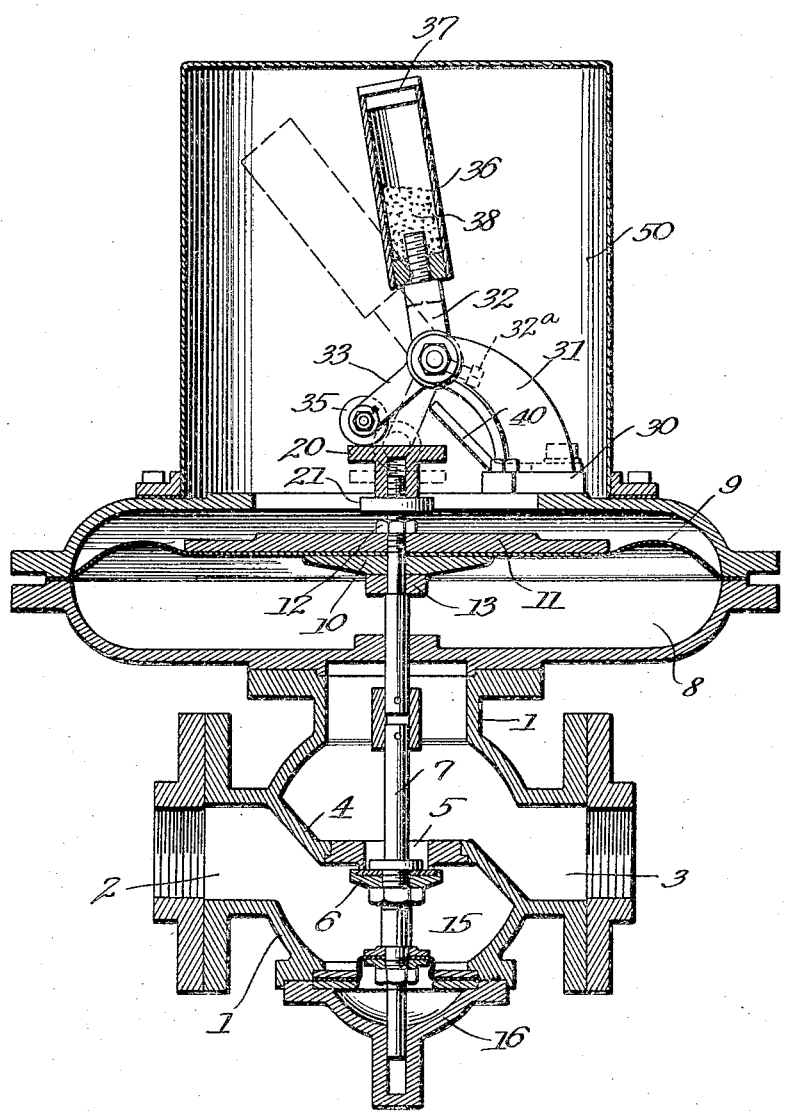
Figure 1 is a vertical sectional view through a fluid pressure regulator embodying the improvements.

Referring to the drawings, in both figures of which like parts are designated by the same reference characters, an embodiment of the invention is shown as applied to a regulator of a common type or form comprising a casing 1 provided with an inlet port 2, an outlet port 3, and having its interior divided by a partition 4 into two chambers which communicate through a port 5.

Passage of fluid through the port 5 is controlled by a valve 6, the stem 7 of which extends upward into a pressure chamber 8 which is supported on the casing 1. A diaphragm 9 is clamped at its edges between separable portions of the walls of the pressure chamber and the valve stem 7 extends through and is suitably secured to said diaphragm.

As shown, the diaphragm adjacent the valve stem 7 is clamped between plates 10 and 11 and by means of a suitable nut 12 the plate 10 is held in contact with an abutment 13 that bears against an annular shoulder on the valve stem. Also, the space in the casing 8 beneath the diaphragm is connected with the interior of the body 1 by a by-pass 1a, and the space above the diaphragm communicates with an atmospheric vent formed in a boss 8a.

In the particular form of the invention shown, the valve stem is also connected to a second diaphragm 15 which is clamped between the walls of the casing 1 and a detachable bottom member 16.

The top of the upper member of the enclosure forming the pressure chamber 8 is apertured and the upper end of the valve stem 7 which extends through said aperture is preferably threaded. On such threaded upper end section of the valve stem is fitted a sleeve 20 which constitutes an extension of the valve stem and may be adjusted longitudinally thereof to vary the effective length of the stem as may be desired. In the embodiment of the invention illustrated, such movement of the extension member 20 to vary the length of the valve stem is effected by a nut 21 which engages the threads on the valve stem and on which the sleeve 20 rests.

On the top of the pressure chamber is mounted a base plate 30 provided with upwardly extending parallel arms 31 and between such arms is arranged a bell crank lever having an upwardly extending arm 32 and a laterally projecting arm 33.

The arms 32, 33 of the bell crank are preferably separable. The lower end of the arm 32 is shown as being forked with the members thereof embracing a fulcrum bar or rod 34 and secured thereto by set screws 32a. The other arm 33 has its upper end fitted on the fulcrum bar or rod 34 between the members of the forked end of the arm 32 and a set screw 33a connects the arm 32 with said fulcrum rod.

By loosening the set screws 32a, 33a, the angular relation of the arms 32, 33 of the bell crank and their position on the fulcrum rod may be varied as desired.

As shown, the bell crank is fulcrumed between the uprights 31, by pins 34a adjustably mounted in said uprights and engaging the ends of the fulcrum bar or rod 34.

The free end of the laterally projecting arm 33 of the bell crank is shown as bifurcated and between the members of such arm is mounted a roller 35 which rests upon the extensible sleeve portion 20 of the valve stem.

The outer end of the upwardly extending arm 32 of the bell crank is preferably reduced somewhat in diameter and provided with a thread with which is engaged the bottom wall of a tubular container 36. The outer end of this container is closed by a removable cap member 37 and a suitable amount of weight material, which may be in the form of shots 38, is placed within such container.

On the base member 30 is mounted a lug or stop 40 which extends toward and is adapted to cooperate with the bell crank arm 33 to limit movement of the bell crank under the influence of the weight in the container 36.

The horizontal arm or member of the stop 40 is connected to the base 30 by a screw extending through a slot in said arm so that the stop may be adjusted bodily to vary the extent to which the bell crank may rock about its axis before the arm 33 thereof will contact with the stop.

As shown, the parts are so positioned that when the valve 6 is closed the upwardly extending weighted arm 32 of the bell crank is in a position slightly inclined from the vertical.

When pressure in the chamber of the casing 1 communicating directly with the outlet port 3 is reduced, the corresponding reduction in pressure in the chamber in casing 8 below the diaphragm 9 permits the weighted diaphragm to move downwardly, opening the valve, and as the valve stem begins such downward movement additional pressure is applied to the extension 20 at the upper end thereof by movement of the bell crank about its axis from the full line position to the position represented in dotted lines in Figure 1.

With pressure regulators of the type herein described, in which movement of the valve is controlled solely by a pressure actuated diaphragm, it is found practically impossible to maintain a constant pressure at the outlet port 3. With such regulators employed for controlling the flow of gas to a series of burners, for example, it is found that if the number of active burners is increased there will be a gradual reduction in the pressure of the gas passing through the outlet port 3. By the present invention, however, this is avoided by the additional pressure exerted on the valve stem by the action of the bell crank arm 33 so that the port 5 will be opened to a greater extent than it would be if movement of the valve were controlled simply by the diaphragms connected to the valve stem.

The roller 35 on the bell crank exerts pressure on the valve stem with a minimum amount of friction and the extent to which the bell crank can rock is readily regulated by adjusting the nut 21, movement of the bell crank in the opposite direction being, as before noted, limited by the stop 40.

As shown, the auxiliary pressure means is enclosed in a suitable casing 50.

The auxiliary weight applied to the upper end of the valve stem will provide for slightly increasing the discharge pressure at the outlet 3 after the valve has been opened to a limited amount and by properly adjusting the stop 40 the valve stem may be relieved of the auxiliary weight when desired.

The adjustable stop 40 acts not only to prevent the arm 33 of the bell crank assuming a substantially vertical position which would lock the valve in open position but it provides means for relieving the valve stem of the action of the auxiliary weight at any desired point in the movement of the stem and thus permit of reducing pressure on the outlet side of the governor when the gas demand exceeds a certain amount.

By varying the angle of the arms of the bell crank and the movement of the weight on the arm 32, as well as the possibility of adjusting the weight chamber 36 the apparatus can be easily adapted to insure increase in delivery pressure to correspond to increases in the demand for gas.

What I claim is:

1. In a fluid pressure regulator, the combination of a casing having suitable inlet and outlet ports and interiorly divided by an apertured partition into two chambers communicating respectively with said ports, a pressure chamber superposed on said casing, a diaphragm within the pressure chamber, a valve cooperating with the apertured partition in the casing to control flow of fluid through the casing, the stem of the valve extending into the pressure chamber and through the diaphragm therein, connections between the valve stem and diaphragm, an adjustable extension on the upper end of the valve stem, and a bell crank lever having an upwardly directed weighted arm and a laterally directed arm that extends over and contacts with the said extension of the valve stem as the lever moves about its pivot under the influence of its said weighted arm.

2. In a fluid pressure regulator, the combination of a casing having suitable inlet and outlet ports and interiorly divided by an apertured partition into two chambers communicating respectively with said ports, a pressure chamber superposed on said casing, a diaphragm within the pressure chamber, a valve cooperating with the apertured partition in the casing to control flow of fluid through the casing, the stem of the valve extending into the pressure chamber and connected to the diaphragm therein, a bell crank having an upwardly directed weighted arm and a laterally directed bifurcated arm, and a roller supported between the members of the last said arm and adapted to transmit pressure to the diaphragm as the bell crank lever is rocked about its pivot by the action of the weight arm thereof.

3. In a fluid pressure regulator, the combination of a casing having suitable inlet and outlet ports and interiorly divided by an apertured partition into two chambers communicating respectively with said ports, a pressure chamber superposed on said casing, a diaphragm within the pressure chamber, a valve cooperating with the apertured partition in the casing to control flow of fluid through the casing, the stem of the valve extending into the pressure chamber and connected to the diaphragm therein, a bell crank having an upwardly directed arm and a laterally directed arm, and a tubular weight receptacle on and adjustable in the direction of the length of said upwardly directed arm, the laterally directed arm being adapted to apply pressure to the diaphragm as the bell crank lever is rocked about its pivot by the action of the weighted arm thereof.

4. In a fluid pressure regulator, the combination with a casing having suitable inlet and outlet ports and provided interiorly with a valve controlling flow of fluid through said ports, and a pressure actuated diaphragm connected with the valve stem, said valve stem having an extension provided with an enlarged head, of means for supplementing the action of the diaphragm in moving the valve to open position including a movable weight having a portion arranged to frictionally engage said head and means in the path of movement of the weight for automatically relieving the diaphragm of the action of the weight when the valve has been opened to a predetermined extent less than the maximum.

In testimony whereof I have hereunto set my hand.

WILLIAM HUNT.